Dec. 17, 1935.    M. CORNELL ET AL    2,024,720
TESTING APPARATUS
Filed Jan. 16, 1933    2 Sheets-Sheet 1
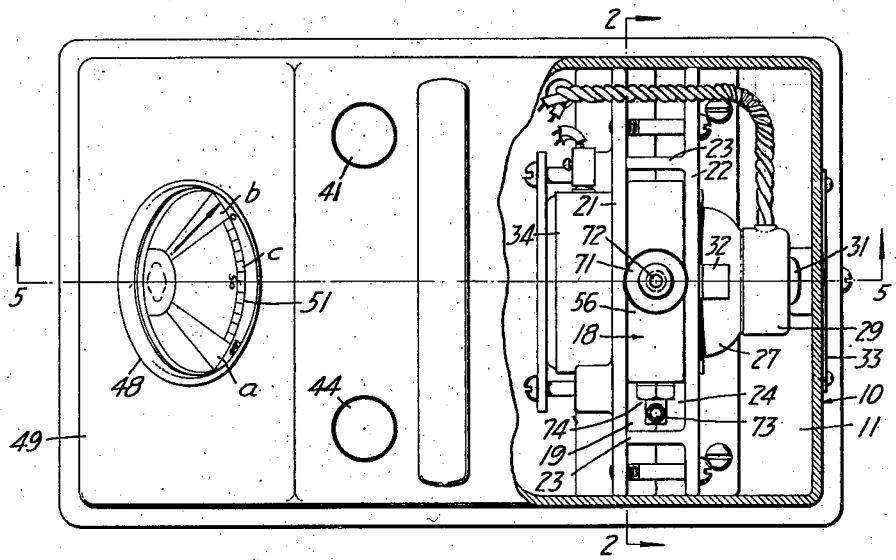
FIG.1
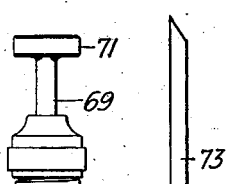
FIG.2
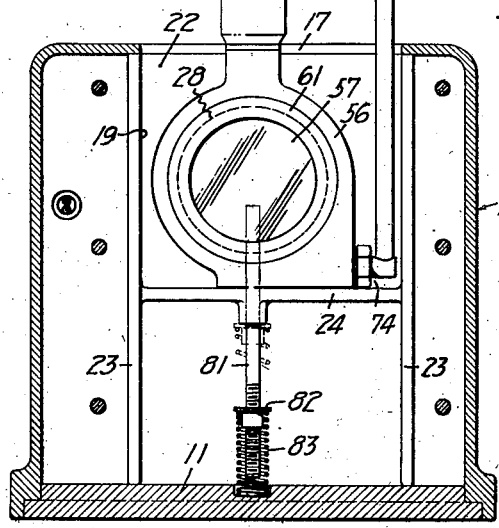
FIG.3
FIG.4
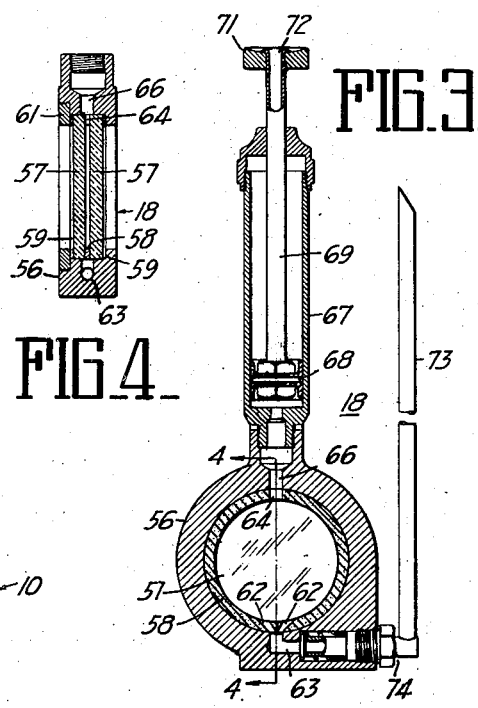
INVENTORS.
Mead Cornell
Charles C. Curtis
BY
White, Prost, Fleharty Lothrop
ATTORNEYS.

Dec. 17, 1935. M. CORNELL ET AL 2,024,720
TESTING APPARATUS
Filed Jan. 16, 1933 2 Sheets-Sheet 2
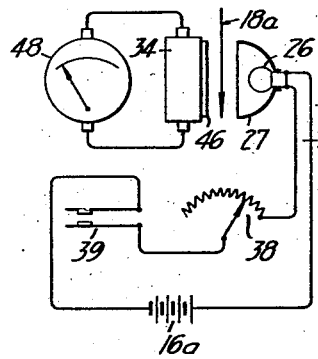
FIG.7.
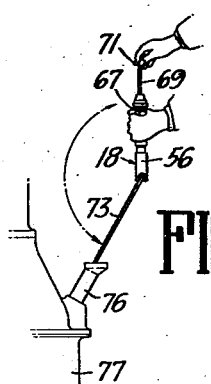
FIG.6.
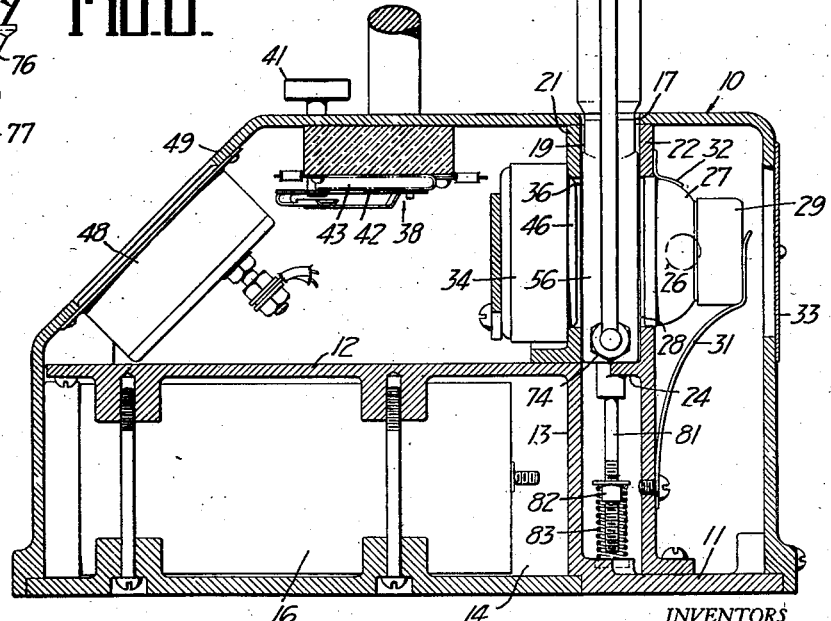
FIG.8.
FIG.5.
INVENTORS.
Mead Cornell
Charles C. Curtis
BY
ATTORNEYS.

Patented Dec. 17, 1935

2,024,720

UNITED STATES PATENT OFFICE 2,024,720

TESTING APPARATUS

Mead Cornell, San Francisco, and Charles C. Curtis, Fruitvale, Calif., assignors to Charles C. Broadwater, Oakland, Calif.

Application January 16, 1933, Serial No. 651,932

3 Claims. (Cl. 88—14)

This invention relates generally to methods and apparatus for determining certain properties or characteristics of petroleum products, particularly lubricating oils.

In our copending application Serial Number 648,842 we have disclosed and claimed a method and apparatus for the testing of various lubricating oils to determine particularly their suitability for further use. Briefly the apparatus disclosed in that application consists of a structure adapted to receive a device in which a sample of the oil to be tested is placed. A suitable source of light is provided, which transmits a beam of light through the oil sample being tested, and the light rays passed through the sample are caused to impinge upon a photoelectric cell or other suitable form of light sensitive apparatus, which serves to effect a response upon a suitable electrical instrument. Because certain factors governing the indication secured are variable from time to time, as for example the intensity of the light source, it is necessary to adjust the apparatus to a given standard level of operation before making a test. However, since certain parts of the sampling device, in addition to the oil sample which may be carried by the same, have a veiling effect upon the light when interposed between the light source and the light sensitive cell, adjustment of the apparatus to a given standard level of operation should occur with the sampling device in its normal position between the light source and the light sensitive cell, but without a sample of oil to be tested. Thus, in practice, immediately before testing a sample of oil, the empty sampling device is positioned between the lamp source and the light sensitive cell, and the current supply to the electric lamp forming the light source is adjusted, until the electrical instrument connected to the light sensitive cell affords a given predetermined indication. Then the oil to be tested is introduced into the sampling device and the test proceeds.

It is apparent that apparatus of the above character may be improperly operated to secure inaccurate indications. For example, the operator may adjust the apparatus without having the empty sampling device positioned between the light source and the light sensitive cell, in which event the subsequent indication secured from the oil sample will not be accurate. It is an object of the present invention to improve upon the method and apparatus disclosed in said copending application Serial Number 648,842, particularly with respect to minimizing the possibility of improperly adjusting the apparatus, prior to making a test upon an oil sample.

More specifically, it is an object of the invention to provide apparatus of the above character which can be adjusted to a standard level of operation either with or without the sampling device placed between the source of light and the light responsive cell.

Further objects of the invention will appear from the following description in which the preferred embodiment of the invention has been set forth in detail in conjunction with the accompanying drawings.

Referring to the drawings:

Figure 1 is a plan view, with certain parts broken away, illustrating one form of our apparatus, which incorporates our method.

Fig. 2 is a cross sectional view taken along the line 2—2 of Fig. 1.

Fig. 3 is a side elevational view of the sampling device utilized as a part of my apparatus, certain parts being in cross section.

Fig. 4 is a cross sectional detail taken along the line 4—4 of Fig. 3.

Fig. 5 is a side elevational view of apparatus as shown in Fig. 1 in cross section.

Fig. 6 is a fragmentary detail, and shows a rheostat utilized in controlling the supply of current to the electric lamp utilized and also showing certain details of the electric switch utilized in conjunction therewith.

Fig. 7 is a circuit diagram showing the manner in which the different parts of my apparatus are electrically connected.

Fig. 8 is a side elevational view, illustrating the manner in which a sample of oil is placed in our sampling device.

The method of our invention can be best understood after a detailed description of the apparatus illustrated in the drawings. As shown particularly in Figs. 1, 2 and 5, the apparatus is portable in form and consists of a housing 10 provided with a removable bottom wall 11. Partitions 12 and 13 (Fig. 5), arranged within the interior of the housing and carried by the bottom wall, serve to provide a compartment 14, for accommodating dry cells 16 or other form of electric battery. The remainder of the interior of the housing serves to enclose other parts of the apparatus, as will be presently explained.

Formed in the top wall of housing 10, there is a lateral slot 17, which serves to receive the sampling device 18. This sampling device serves to retain a sample of oil in such a manner that a beam of light may be passed thru the same. In order to form a recess or pocket 19 extending downwardly from slot 17, to receive a portion of the sampling device, a pair of vertical partition walls 21 and 22 have been provided. Flanges 23 formed on partition 22, serve to define the vertical edges of recess 19. When positioned within recess 19, the sampling device can rest upon a fixed shelf 24.

To form a suitable source of light, we have shown an electric lamp globe 26 of the filament type associated with a suitable reflector 27. The periphery of reflector 27 is positioned within an opening 28 formed in partition 22, so that the light will be transmitted directly upon a portion of the sampling device. To permit removal of reflector 27, thus enabling renewal of lamp 26, the base 29 of the reflector is shown retained in operating position by spring strip 31. Likewise fingers 32, fixed to the reflector 27, serves to engage partition 22 about opening 28. Removal of the reflector together with the lamp 26 can be facilitated by providing a removal closure 33, in the rear wall of housing 10.

Positioned upon the other side of the sampling device 18 and carried by the partition 21, there is a suitable photoelectric or light sensitive cell 34. An opening 36 in partition 21, exposes that face of the cell 34 which is adapted to receive light rays. In addition to the parts described above, which are mounted upon the housing 10, we provide a rheostat 38 and a switch 39, which are incorporated in an electrical circuit from dry cell 16, and which serve to control the supply of current to the lamp 26. Rheostat 38 may be of conventional type, and is shown with an external control knob 41. As illustrated it consists of a contact arm 42, operating upon an arcuate coiled resistor 43. Switch 39 may likewise be of conventional construction, and is shown provided with an external operating button 44, which when pressed downwardly serves to close the electrical circuit.

Interposed at some point between lamp 26, and the electrical element or elements within cell 34 which are light sensitive, we preferably provide a proper light filter, having certain predetermined characteristics, as will be presently explained. In the construction as shown in Fig. 5, this light filter has been indicated at 46, and extends over the front face of the cell 34. However it may be otherwise positioned, as for example between the lamp 26 and sampling device 18, or it may be incorporated as a part of the sampling device. Likewise the filter may consist of a number of elements variously positioned to affect the light rays in the manner desired.

To operate in conjunction with cell 34, we provide suitable indicating means, which is preferably electrical in character. Due to the type of photoelectric cell which is preferably employed, this indicating means may consist simply of a microammeter 48, which is shown mounted within the housing in such a manner that its face is readable through the housing end wall 49. As evident from Fig. 1, this microammeter can be provided with a special graduated scale 51, to more directly apprise the operator of the character of the oil being tested.

Suitable circuit connections for certain of the parts described above are illustrated in Fig. 7. In this instance battery 16a corresponds to the dry cells 16, and electrical circuit 52 which includes this battery is connected to the electrical lamp 26, in series with the rheostat 38 and the electrical switch 39. Meter 48 is directly connected to the terminals of the photoelectric cell 34. Sampling device 18, in its operating position during testing of an oil sample, is represented by the arrow 18a.

It may be explained at this point that a proper type of light sensitive cell must be utilized, if the indicating means is to consist of a meter directly connected to the terminals of the same. Light sensitive cells capable of operating in this manner are available on the open market, and are commonly known as photronic photoelectric cells. They are generally constructed of anode and cathode elements, together with a light sensitive material such as copper oxide. When light rays fall upon the light sensitive material, electrical current is generated, which is capable of operating a microammeter, galvanometer, or like indicating instrument. As generally constructed, such cells are responsive to a fairly wide band of the light spectrum, including that portion of the spectrum corresponding to the natural color of the unused lubricating stocks, as well as to the red end of the spectrum.

A desirable form of sampling device has been illustrated in detail in Figs. 3 and 4. Sampling device consists of a ring-shaped body 56, carrying a pair of spaced parallel walls 57, which are formed of suitable light transmitting material, such as plate glass. The spacing between these plates should be comparatively accurate, and of small dimensions. For example a spacing of about 15/1000ths of an inch has given good results. Interposed between the plates 57 there is a gasket 58 formed of a suitable material such as thin sheet metal, and which serves to secure accurate spacing. Gaskets 59 engage the outer peripheral edge portions of plates 57, and the plate assembly, together with the inner and outer gaskets, are clamped together in tight engagement by ring 61. To insert liquid into the space between plates 57, gasket 58 is provided with a pair of divergent slots 62, which comunicate with the liquid passage 63. Likewise to apply suction to the space between plates 57, to cause inflow of liquid, gasket 58 is shown provided with slot 64, which communicates with the liquid passage 66.

To provide suction means to be used in filling the sampling device with oil to be tested, we have shown a simple form of suction pump consisting of a barrel 67, the lower end of which is in communication with liquid passage 66. Slidably fitted within barrel 67 there is a piston 68, connected to the inner end of a tubular piston rod 69. Secured to the outer end of tube 69 there is an operating button or knob 71, which is provided with an aperture 72 communicating with the interior of tube 69. Passage through tube 69 also communicates with the space below piston 68. To facilitate withdrawing a sample of oil from the crank case of an internal combustion engine, we have provided an inlet tube 73, one end of which is provided with a swivel connection 74 to body 56. Through this swivel connection, tube 73 is in communication with liquid passage 63. The manner in which the sampling device described above is utilized in securing a sample of oil from the crank case of an internal combustion engine, is illustrated in Fig. 8. Filling tube 73 is swung downwardly and extended into the oil filling pipe or breather pipe 76, of the engine 77. The operator then places one finger over port 72 to close the same, and then raises button 71 to create a suction beneath piston 68. Thereupon oil immediately flows upwardly thru tube 73, and into the space between plates 57 thru liquid passage 63 and passages 62. When the space between plates 57 has been filled, the operator withdraws tube 73, and then by swinging this tube to a vertical position, the sample of oil so obtained is trapped within the device, and the device with the oil sample within the same can then be placed within pocket 19 for a test.

Since our apparatus is intended to be used to determine when lubricating oil is unfit for further service, or to determine the extent to which lubricating oil has been broken down thru use, the absorption of light rays by the sample of oil being tested, must be such as to indicate the presence of factors or ingredients in the oil, which appear due to a break-down of the oil in use. When lubricating oil becomes broken down in use, certain ingredients invariably make their appearance, as for example certain solids such as carbon, which may be of colloidal fineness, and products of decomposition such as petrolic, naphthenic and other acids and asphaltic residues. However various lubricating oil stocks, with which the apparatus may be used from time to time, and various natural color ingredients will therefore serve to absorb or filter certain light rays generated from an ordinary filament electric lamp, to various degrees depending upon the nature of the natual color of ingredients present. Thus if a light filter of proper characteristics were not utilized with our apparatus, varying stocks of new oil having different color characteristics, would afford decidedly different indications on the meter 48. By the use of a color filter of proper characteristics, the effect of varying natural color of oil is made negligible. This has been made possible by the discovery that a filter can be provided which matches that band of the light spectrum corresponding to the various colors of the different unused lubricating oil stocks now available on the market.

In practice we utilize a color filter 46 which is absorptive with respect to the violets, blues and the major part of the green rays of the light spectrum. It is evident that glass plates 57 of the sampling device, are likewise to a certain extent absorptive with respect to certain rays such as the ultra-violet and violet. The band of the light spectrum over which the filter is thus effective is substantially greater than the band represented by the natural colors of various lubricating oil stocks. However such a marginal overlap has been found desirable to secure the desired result of rendering the apparatus substantially immune from the effects of varying natural colors. The effect secured by filtering the light in the manner just described, can also be explained by stating that the filtering renders the sample of the oil substantially transparent, insofar as natural colors of lubricating oil stocks are concerned. In practice good results have been secured by a filter having a cut-off toward the end of the spectrum, of about 5800 as in terms of Angstrom units. In this connection we have found that the colors of various unused lubricating oils occupy a band terminating at about 4800 as expressed in the same units.

Although a color filter is desirable when an ordinary filament type of lamp is utilized as a source of light, and when the photoelectric cell is responsive to a large portion of the light spectrum, it is believed possible to omit a special filter by utilizing a red emitter as a source of light rays, or by employing a photoelectric cell which is responsive only to the red end of the spectrum.

The indication secured with our apparatus is a comparative one, in that it indicates the condition of used lubricating oil, as compared to the condition of fresh or unused lubricating oil. Since certain variable factors are involved in operation of the apparatus, aside from variations in the oil samples tested, in order to secure proper accuracy the apparatus should be adjusted to secure a standard level of operation, before making a test. One of the principal variable factors is the intensity of the illumination of lamp 26, due to variations in the potential from dry cells 16. To adjust the apparatus to a standard level of operation, without use of the improved feature to be hereinafter described, the operator places the sampling device within recess 19, button 41 is pressed to illuminate lamp 26 and the indication of meter 48 is noted. At this time the sampling device should be clean and empty, or should contain a sample of fresh or unused lubricating oil. If the pointer of meter 48 now falls upon a predetermined point within portion b of the meter scale, the instrument is properly adjusted. However if the pointer deviates from the calibration point on portion b of the scale, rheostat 41 is adjusted, to vary the current supply to lamp 26, until the desired indication is secured. In the event the operator attempts such adjustment without the sampling device within recess 19, it is evident that the adjustment will not be proper to secure an accurate reading of a sample of used oil. This is for the reason that certain parts of the sampling device when placed within recess 19, as for example the opaque parts immediately surrounding plates 57, and to a certain extent the plates themselves, have a veiling effect to effectively reduce the light transmitted to cell 34, and thus effectively reduce the response recorded by meter 48. The improved feature to be subsequently explained makes it possible for the operator to adjust the apparatus to a standard level of operation either with or without the sampling device in place between the source of the light and the light sensitive cell. This is accomplished by what can be termed a dummy screen, which is automatically moved in place between the source of light and the light sensitive cell, when the sampling device is removed and which is automatically moved to an out of the way position when the sampling device is re-positioned within the recess.

Thus referring particularly to Fig. 2, the dummy screen in this instance consists of a rod 81, which extends slidably thru the shelf 24. A portion of this rod is threaded to receive a nut 82. The rod is continuously biased upwardly into recess 19, by means of a compression spring 83. The lower end of this spring is shown seated upon wall 11, and the upper end upon nut 82. Obviously when the sampling device is removed from recess 19, rod 81 takes the position illustrated in dotted lines in Fig. 2. However when the sampling device is repositioned within the recess, rod 81 is forced downwardly to the position illustrated in solid lines, and is retained in such position by the weight of the sampling device.

It will be noted as illustrated in Fig. 2, that the light intercepting area of the upper end of rod 81 is smaller than the light intercepting area of the sampling device. However because of the location of rod 81, when in its uppermost position, it intercepts light falling upon relatively sensitive portions of the photoelectric cell, and therefore it is capable of an effective veiling substantially equal to the veiling effect of the sampling device. Rod 81 can preferably be adjusted, so that in its uppermost or light intercepting position, it can be raised or lowered to secure the desired degree of veiling effect. In the construction illustrated such adjustment can be had by turning rod 81, relative to nut 82.

The manner in which our apparatus is utilized in practice can now be reviewed. As has been previously explained, assuming that the apparatus has not been utilized for some time, the operator first assures himself that the apparatus is properly adjusted to a standard level of operation, by pressing button 44, to illuminate lamp 26, while noting the indication of meter 48. The pointer of the meter should stop on the graduation point within that portion of the scale indicated by letter a, which represents new or unused oil. At this time the sampling device may be removed, in which event an equivalent veiling effect is provided by rod 81, or it may be positioned within the recess 19, provided it is empty and clean, or filled with unused lubricating oil. If the pointer of the meter does not fall on that point of the scale within portion a, then the rheostat knob 41 is turned to vary the current supply to the lamp, until the proper indication is secured. A sample of the used lubricating oil to be tested is now drawn into the sampling device, and the device then introduced into recess 19. The operator then again presses button 44, and notes the indication of meter 48. If the indication now falls within that portion of the scale marked by letter b, the oil has been broken down thru use beyond that point where the oil is suitable for further lubricating purposes. However if the indication falls within that portion of the scale marked by letter c, then the oil has become partially broken down, but is still capable of service. In this connection it should be noted that the meter is preferably so calibrated as to secure an indication which will directly indicate the condition of the oil with respect to suitability for further use.

We claim:

1. In apparatus of the type described, a structure formed to provide a recess, a source of light carried within said structure, a light sensitive cell carried by said structure and arranged to receive light from said source, the recess being disposed between the source of light and the cell, a relatively opaque light-intercepting member carried by said structure and movable between two positions, in one position the member serving to partially intercept light received by the cell from said source, and in the other position the member having substantially no effect upon such light, means for biasing said member toward said first-named position, and means including a liquid-receiving sampling device for effecting retraction of said member to said other position responsive to insertion of the device into said recess, said sampling device being removable as a unit from the remainder of the apparatus.

2. In apparatus of the type described, a structure formed to provide a recess, a source of light carried within said structure, a light sensitive cell arranged to receive light from said source, the recess being disposed between the source of light and the cell, a relatively opaque light-intercepting member carried by said structure and movable between two positions, in one position the member serving to partially intercept light received by the cell from said source, and in the other position the member having substantially no effect upon such light, means for biasing said member toward said first-named position, means including a liquid-receiving sampling device for effecting retraction of said member to said other position responsive to insertion of the device into said recess, said sampling device being removable as a unit from the remainder of the apparatus, and means for adjusting said first-mentioned position of said member whereby the light-intercepting characteristics of the same can be made to substantially match the light-intercepting characteristics of said sampling device.

3. In apparatus of the type described, a structure formed to provide a recess, a source of light carried within said structure, a light sensitive cell arranged to receive light from said source, the recess being disposed between the source of light and the cell, a relatively opaque light-intercepting member carried by said structure and movable between two positions, in one position the member extending into said recess to partially intercept light received by the cell from said source, and in the other position the member having substantially no effect upon such light, means for normally urging said member toward said first-named position, and means including a liquid-receiving sampling device for effecting retraction of said member responsive to insertion of the device into said recess, a portion of the sampling device having abutting engagement with said member when the device is inserted in said recess.

MEAD CORNELL.
CHARLES C. CURTIS.